US011308632B2

(12) United States Patent
Wang et al.

(10) Patent No.: US 11,308,632 B2
(45) Date of Patent: Apr. 19, 2022

(54) CODE POINT-DRIVEN THREE-DIMENSIONAL POINT CLOUD DEFORMATION METHOD

(71) Applicant: NANJING UNIVERSITY OF AERONAUTICS AND ASTRONAUTICS, Jiangsu (CN)

(72) Inventors: Jun Wang, Jiangsu (CN); Zeyong Wei, Jiangsu (CN); Qian Xie, Jiangsu (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 17/169,513

(22) Filed: Feb. 7, 2021

(65) Prior Publication Data

US 2021/0334987 A1   Oct. 28, 2021

(30) Foreign Application Priority Data

Apr. 23, 2020  (CN) .......................... 202010327891.7

(51) Int. Cl.
*G06T 7/246* (2017.01)
*G06T 7/292* (2017.01)
*G06T 7/73* (2017.01)
*G06T 7/33* (2017.01)
*G06T 17/00* (2006.01)
*G06T 19/20* (2011.01)

(52) U.S. Cl.
CPC ............. *G06T 7/251* (2017.01); *G06T 7/248* (2017.01); *G06T 7/292* (2017.01); *G06T 7/344* (2017.01); *G06T 7/74* (2017.01); *G06T 17/00* (2013.01); *G06T 19/20* (2013.01); *G06T 2207/10028* (2013.01); *G06T 2207/30204* (2013.01); *G06T 2210/56* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 10,356,394 B2* | 7/2019 | Kim | H04N 13/239 |
| 10,914,576 B2* | 2/2021 | Zheng | G01B 11/2513 |
| 11,242,389 B2* | 2/2022 | Schneider | C07K 14/7051 |
| 11,245,424 B2* | 2/2022 | Bioglio | H03M 13/033 |
| 2008/0201101 A1* | 8/2008 | Hebert | G01B 11/2513 |
| | | | 702/152 |
| 2016/0364905 A1* | 12/2016 | Jung | G06T 17/20 |

(Continued)

FOREIGN PATENT DOCUMENTS

| | | |
|---|---|---|
| CN | 110672029 A | 1/2020 |
| CN | 110986757 A | 4/2020 |

*Primary Examiner* — Ryan M Gray

(57) ABSTRACT

Disclosed herein is a code point-driven three-dimensional (3D) point cloud deformation method. In the method, movable code points and fixed code points are respectively pasted on a moving structure and a static structure. Reference poses of the movable code points and fixed code points are obtained by a dual-camera measurement system, and a 3D point cloud reference model containing the moving structure and the static structure is obtained by 3D laser scanning. A transformation matrix of each code point is calculated, and a real-time point cloud model is established based on the transformation matrix to complete the real-time and dynamic measurement of the moving structure.

7 Claims, 2 Drawing Sheets

(56) References Cited

U.S. PATENT DOCUMENTS

2019/0073744 A1\* 3/2019 Agarwal ................. G06T 7/337
2021/0172732 A1\* 6/2021 Gan ................... G01B 11/2504
2022/0020204 A1\* 1/2022 Coffey ................. G06T 15/005

\* cited by examiner

CODE POINT-DRIVEN THREE-DIMENSIONAL POINT CLOUD DEFORMATION METHOD

CROSS-REFERENCE TO RELATED APPLICATIONS

This application claims the benefit of priority from Chinese Patent Application No. 202010327891.7, filed on Apr. 23, 2020. The content of the aforementioned application, including any intervening amendments thereto, is incorporated herein by reference in its entirety.

TECHNICAL FIELD

This application relates to aerial survey, and more particularly to a code point-driven three-dimensional (3D) point cloud deformation method.

BACKGROUND

It is always difficult to perform real-time monitoring of the deformation and position of moving parts and deformable and deployable structures (such as the movable panel on the wing and undercarriage door) on the aircraft during the movement and deployment. Currently, most of the real-time measurement techniques are merely suitable for the real-time measurement of static objects or instantaneous measurement of small objects. For a larger component, its structure is partially in motion when a deformation occurs. Considering the relatively large structure, it requires a certain time for a 3D scanner to obtain the entire point cloud data, and the entire component cannot be simultaneously measured. At this time, the point cloud data of the structure in a motion state obtained by the 3D scanner will be distorting and chaotic.

SUMMARY

An object of this disclosure is to provide a code point-driven 3D point cloud deformation method, which can be applied to the real-time monitoring of moving parts during the deformation.

Technical solutions of this disclosure are specifically described as follows.

This disclosure provides a code point-driven 3D point cloud deformation method for monitoring a deformation state of a moving structure relative to a static structure connected thereto, comprising:

(1) pasting a plurality of movable code points for recording a real-time pose of the moving structure on a surface of the moving structure uniformly, and pasting a plurality of fixed code points on a surface of the static structure uniformly;

(2) when the moving structure is in a static state, obtaining a reference pose of each of the plurality of movable code points and a reference pose of each of the plurality of fixed code points using a dual-camera measurement system, and at the same time, obtaining a 3D point cloud reference model comprising parts of the moving structure and parts of the static structure using a 3D laser scanner;

(3) when the moving structure is moving, regularly photographing, by the dual-camera measurement system, the moving structure and the static structure to obtain a real-time pose of each of the plurality of movable code points and a real-time pose of each of the plurality of fixed code points at different time points; aligning each of the plurality of fixed code points at each time point with the corresponding fixed code point when the moving structure is in a static state, and comparing the reference pose of any of the plurality of movable code points when the moving structure is in a static state with a real-time pose of the corresponding movable code point at each time point; and (4) calculating a transformation matrix from the reference pose of any of the plurality of movable code points when the moving structure is in a static state to real-time pose of the corresponding movable code point at each time point; and transforming point cloud of the moving structure in the 3D point cloud reference model through the transformation matrix at each time point to obtain real-time point cloud model data.

In an embodiment, the dual-camera measurement system comprises cameras C1 and C2, and step (2) comprises:

(2.1) when the moving structure is in a static state, taking an image containing the moving structure and the static structure respectively by the cameras C1 and C2 at the same time, wherein in step (1), the plurality of movable code points are pasted on a surface of the moving structure facing the dual-camera measurement system, and the plurality of fixed code points are pasted on a surface of the static structure facing the dual-camera measurement system;

solving position data of each of the plurality of movable code points and each of the plurality of fixed code points according to spatial position information of the same point in the two images taken by the cameras C1 and C2 using internal and external parameters of the cameras C1 and C2 to obtain three-dimensional coordinates of each of the plurality of movable code points and each of the plurality of fixed code points in a coordinate system of the cameras C1 and C2 as a reference state for feedback of a subsequent motion measurement;

(2.2) subjecting the moving structure and the static structure to 3D scanning using the 3D laser scanner to obtain the 3D point cloud reference model comprising the parts of the moving structure and the static structure; and (2.3) dividing the 3D point cloud reference model into the point cloud of the moving structure and a point cloud of the static structure.

In an embodiment, in step (2.1), a three-dimensional coordinate of each code point is solved through steps of:

supposing that a code point P(X,Y,Z) has a corresponding point $P_1$ $(u_1,v_1)$ in the image taken by the camera C1 and a corresponding point $P_2$ $(u_2,v_2)$ in the image taken by the camera C2, wherein projection matrixes of the cameras C1 and C2 are respectively M and N:

$$M = \begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix}$$

$$N = \begin{bmatrix} n_{11} & n_{12} & n_{13} & n_{14} \\ n_{21} & n_{22} & n_{23} & n_{24} \\ n_{31} & n_{32} & n_{33} & n_{34} \end{bmatrix};$$

wherein $m_{ij}$ is an element in the $i^{th}$ row and the $j^{th}$ column of the projection matrix M; and $n_{ij}$ is an element in the $i^{th}$ row and the $j^{th}$ column of the projection matrix N;

deducing equations (1) and (2) based on the projection matrixes M and N:

$$Z_1 \begin{bmatrix} u_1 \\ v_1 \\ 1 \end{bmatrix} = \begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix} \begin{bmatrix} X \\ Y \\ Z \\ 1 \end{bmatrix} \quad (1)$$

$$Z_2 \begin{bmatrix} u_2 \\ v_2 \\ 1 \end{bmatrix} = \begin{bmatrix} n_{11} & n_{12} & n_{13} & n_{14} \\ n_{21} & n_{22} & n_{23} & n_{24} \\ n_{31} & n_{32} & n_{33} & n_{34} \end{bmatrix} \begin{bmatrix} X \\ Y \\ Z \\ 1 \end{bmatrix}; \quad (2)$$

wherein $Z_1$ is a Z-axis coordinate of the code point P in a coordinate system of the camera C1; $Z_2$ is a Z-axis coordinate of the code point P in a coordinate system of the camera C2; $(u_1,v_1,1)$ is a homogeneous coordinate of the point $P_1$ in the image taken by the camera C1; $(u_2,v_2,1)$ is a homogeneous coordinate of the point $P_2$ in the image taken by the camera C2; and (X,Y,Z,1) is a homogeneous coordinate of the code point P in a world coordinate system;

eliminating $Z_1$ and $Z_2$ through the equations (1) and (2) to obtain four linear equations of X, Y and Z:

$(u_1 m_{31} - m_{11})X + (u_1 m_{32} - m_{12})Y + (u_1 m_{33} - m_{13})Z = m_{14} - u_1 m_{34}$ $(v_1 m_{31} - m_{21})X + (v_1 m_{32} - m_{22})Y + (v_1 m_{33} - m_{23})Z = m_{24} - v_1 m_{34}$ $(u_2 n_{31} - n_{11})X + (u_2 n_{32} - n_{12})Y + (u_2 n_{33} - n_{13})Z = n_{14} - u_2 n_{34}$ $(v_2 n_{31} - n_{21})X + (v_2 n_{32} - n_{22})Y + (v_2 n_{33} - n_{23})Z = n_{24} - v_2 n_3$;

and solving the four linear equations to obtain the coordinate (X,Y,Z) of the code point P.

In an embodiment, step (3) comprises:

(3.1) when the moving structure is in motion, at any time point, taking an image containing the moving structure and the static structure respectively by the cameras C1 and C2 at the same time;

solving position data of each of the plurality of movable code points and each of the plurality of fixed code points at the time point according to spatial position information of the same point in the two images taken by the cameras C1 and C2 using internal and external parameters of the cameras C1 and C2 to obtain three-dimensional coordinates of each of the plurality of movable code points and each of the plurality of fixed code points in the coordinate system of the cameras C1 and C2 at the time point;

(3.2) calculating a transformation matrix from a real-time pose of any of the plurality of fixed code points to a reference pose of the corresponding fixed code point when the moving structure is stationary by singular value decomposition (SVD) method;

(3.3) transforming poses of all of the plurality of movable code points and the plurality of fixed code points at the time point through the transformation matrix obtained at the time point;

(3.4) calculating a transformation matrix from a reference pose of any of the plurality of movable code points when the moving structure is stationary to a real-time pose of the corresponding movable code point at the time point after the transformation in step (3.3) by the SVD method; and (3.5) repeating steps (3.1)-(3.4) to complete calculation of transformation matrixes of the plurality of movable code points at all time points.

In an embodiment, step (4) comprises:

(4.1) transforming the point cloud of the moving structure separated in step (2.3) according to the transformation matrix calculated in step (3.4) to obtain a real-time point cloud model of the moving structure;

(4.2) combining the real-time point cloud model of the moving structure with a reference point cloud model of the static structure to obtain a complete point cloud model at the current time point; and (4.3) repeating steps (4.1)-(4.2) to obtain complete point cloud models at all time points.

Compared to the prior art, this disclosure has the following beneficial effects.

A code point-driven 3D point cloud deformation method is proposed herein based on a code point-constrained rigid body deformation law. In the method, a 3D scanning point cloud model is combined with dynamic real-time measured data, and a dual-camera system is employed for real-time measurement. A transformation matrix of the code point is calculated, and then the dynamic real-time measurement of the pose of the moving structure is completed through the point cloud transformation and registration, overcoming the difficulty in the real-time measurement of components during deformation.

DETAILED DESCRIPTION OF EMBODIMENTS

The code point-driven 3D point cloud deformation method provided herein will be further described in detail below with reference to the accompanying drawings and embodiments.

Figure 1:
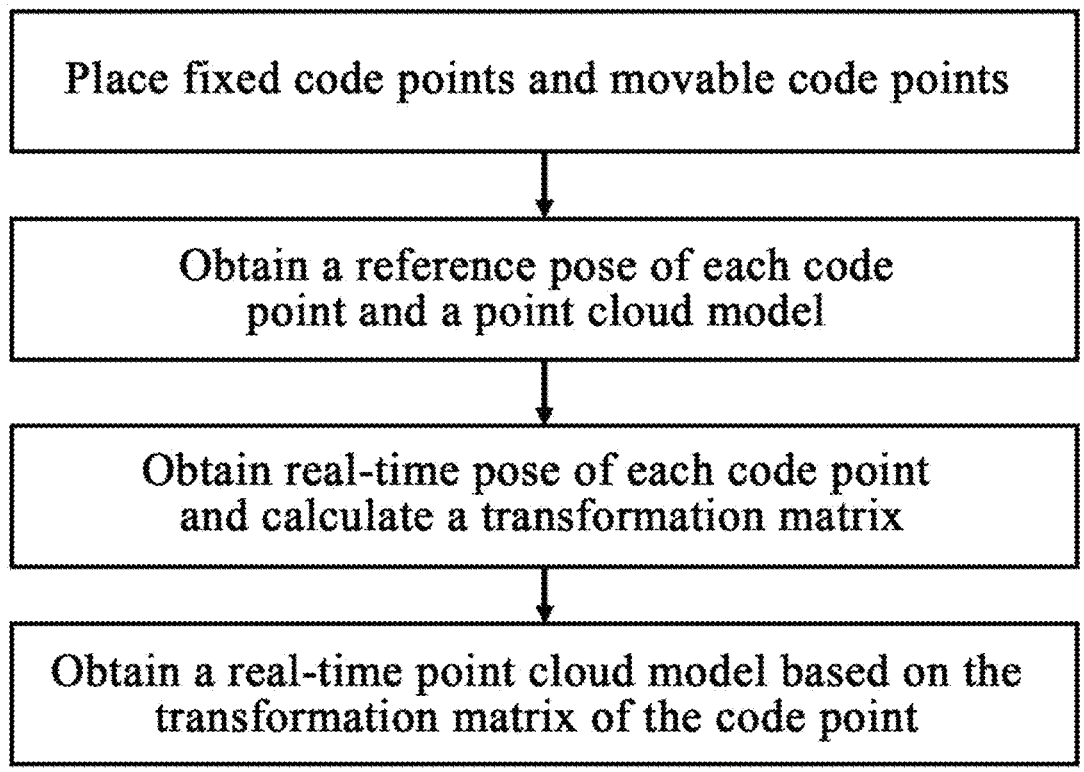
FIG. 1 is a flow chart of a code point-driven 3D point cloud deformation method according to an embodiment of the disclosure.

As shown in FIG. 1, this disclosure provides a code point-driven 3D point cloud deformation method for monitoring a deformation state of a moving structure relative to a static structure connected thereto, which is specifically performed as follows.

(1) A plurality of movable code points are uniformly pasted on a surface of the moving structure, and a plurality of fixed code points are uniformly pasted on a surface of the static structure.

The fixed code points pasted on the static structure are used to record the pose changes of the entire component including the moving structure and the static structure and to match the poses of the fixed code points at subsequent time points to the reference position. The movable code points on the moving structure are used to record the real-time pose of the moving structure, enabling the calculation of the pose change of the moving structure at each time point after the fixed code points are subjected to alignment.

(2) when the moving structure is in a static state, a reference pose of each of the movable code points and a reference pose of each of the fixed code points are obtained using a dual-camera measurement system, and at the same time, a 3D point cloud reference model including parts of the moving structure and the static structure is obtained using a 3D laser scanner, where the dual-camera measurement system includes cameras C1 and C2.

The step (2) is specifically performed as follows.

Figure 2:
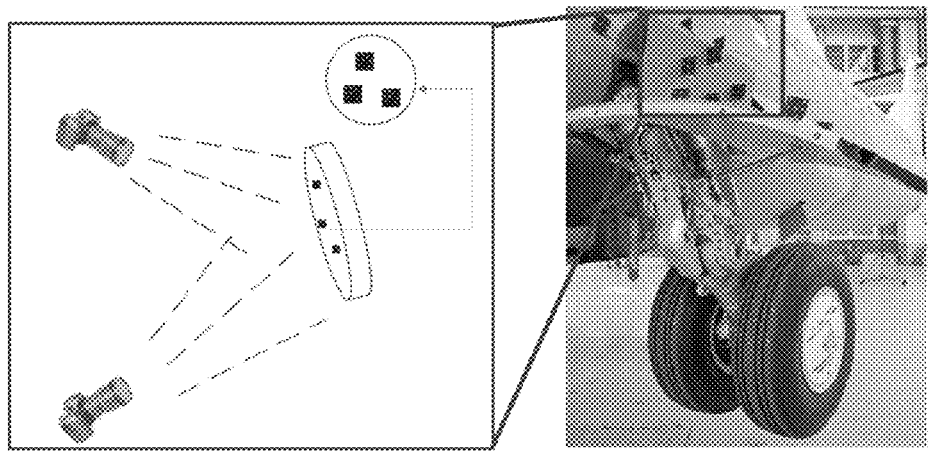
FIG. 2 schematically illustrates pasting positions of code points and how the dual-camera system shoots the code points according to an embodiment of the disclosure.

(2.1) When the moving structure is in a static state, an image containing the moving structure and the static structure is taken respectively by the cameras C1 and C2 at the same time. In step (1), the movable code points are pasted on a surface of the moving structure facing the dual-camera measurement system, and the fixed code points are pasted on a surface of the static structure facing the dual-camera measurement system, so as to ensure that the movable code points and the fixed code points can be captured by the dual-camera measurement system during the entire movement process of the moving structure, that is, the entire deformation process should be performed within a visible area of the dual-camera measurement system (see FIG. 2).

Position data of each of the movable code points and each of the fixed code points is solved according to spatial position information of the same point in the two images using internal and external parameters of the cameras C1 and C2 to obtain three-dimensional coordinates of each of the movable code points and each of the fixed code points in a coordinate system of the cameras C1 and C2 as a reference state for feedback of a subsequent motion measurement.

In step (2.1), a three-dimensional coordinate of each code point is solved as follows.

It is supposed that a code point P(X,Y,Z) has a corresponding point $P_1$ $(u_1,v_1)$ in the image taken by the camera C1 and a corresponding point $P_2$ $(u_2,v_2)$ in the image taken by the camera C2, where projection matrixes of the cameras C1 and C2 are respectively M and N:

$$M = \begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix}$$

$$N = \begin{bmatrix} n_{11} & n_{12} & n_{13} & n_{14} \\ n_{21} & n_{22} & n_{23} & n_{24} \\ n_{31} & n_{32} & n_{33} & n_{34} \end{bmatrix};$$

where $m_{ij}$ is an element in the $i^{th}$ row and the $j^{th}$ column of the projection matrix M; and $n_{ij}$ is an element in the $i^{th}$ row and the $j^{th}$ column of the projection matrix N.

Equations (1) and (2) are deduced based on the projection matrixes M and N:

$$Z_1 \begin{bmatrix} u_1 \\ v_1 \\ 1 \end{bmatrix} = \begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix} \begin{bmatrix} X \\ Y \\ Z \\ 1 \end{bmatrix} \quad (1)$$

$$Z_2 \begin{bmatrix} u_2 \\ v_2 \\ 1 \end{bmatrix} = \begin{bmatrix} n_{11} & n_{12} & n_{13} & n_{14} \\ n_{21} & n_{22} & n_{23} & n_{24} \\ n_{31} & n_{32} & n_{33} & n_{34} \end{bmatrix} \begin{bmatrix} X \\ Y \\ Z \\ 1 \end{bmatrix}; \quad (2)$$

where $Z_1$ is a Z-axis coordinate of the code point P in a coordinate system of the camera C1; $Z_2$ is a Z-axis coordinate of the code point P in a coordinate system of the camera C2; $(u_1,v_1,1)$ is a homogeneous coordinate of the point $P_1$ in the image taken by the camera C1; $(u_2,v_2,1)$ is a homogeneous coordinate of the point $P_2$ in the image taken by the camera C2; and (X,Y,Z,1) is a homogeneous coordinate of the code point P in a world coordinate system.

$Z_1$ and $Z_2$ are eliminated through the equations (1) and (2) to obtain four linear equations of X, Y and Z:

$$(u_1 m_{31} - m_{11})X + (u_1 m_{32} - m_{12})Y + (u_1 m_{33} - m_{13})Z = m_{14} - u_1 m_{34}$$

$$(v_1 m_{31} - m_{21})X + (v_1 m_{32} - m_{22})Y + (v_1 m_{33} - m_{23})Z = m_{24} - v_1 m_{34}$$

$$(u_2 n_{31} - n_{11})X + (u_2 n_{32} - n_{12})Y + (u_2 n_{33} - n_{13})Z = n_{14} - u_2 n_{34}$$

$$(v_2 n_{31} - n_{21})X + (v_2 n_{32} - n_{22})Y + (v_2 n_{33} - n_{23})Z = n_{24} - v_2 n_{34}.$$

The four linear equations are solved to obtain the coordinate (X,Y,Z) of the code point P.

(2.2) The moving structure and the static structure are subjected to 3D scanning using the 3D laser scanner to obtain the 3D point cloud reference model including the parts of the moving structure and the static structure.

(2.3) The 3D point cloud reference model is divided into the point cloud of the moving structure and the point cloud of the static structure.

Generally, there is relatively obvious difference between the moving structure and the static structure, so that the three-dimensional reference point cloud model can be divided into point clouds belonging to the moving structure and point clouds belonging to the static structure through point cloud processing software (such as CloudCompare).

(3) When the moving structure is moving, the moving structure and the static structure are regularly photographed by the dual-camera measurement system to obtain a real-time pose of each of the movable code points and a real-time pose of each of the fixed code points at different time points. Each of the fixed code points at each time point is aligned with the corresponding fixed code point when the moving structure is in a static state, and the reference pose of any of the movable code points when the moving structure is in a static state is compared with a real-time pose of the corresponding movable code point at each time point to calculate a transformation matrix.

Specifically, the step (3) is performed as follows.

(3.1) When the moving structure is in motion, at any time point, an image containing the moving structure and the static structure is taken respectively by the cameras C1 and C2 at the same time.

The position data of each of the movable code points and each of the fixed code points at the time point is solved according to spatial position information of the same point in the two images taken by the cameras C1 and C2 using internal and external parameters of the cameras C1 and C2 to obtain three-dimensional coordinates of each of the movable code points and each of the fixed code points in the coordinate system of the cameras C1 and C2 at the time point.

(3.2) A transformation matrix from a real-time pose of any of the fixed code points to a reference pose of the corresponding fixed code point when the moving structure is stationary is calculated by SVD method.

(3.3) Poses of all of the movable code points and the fixed code points at the time point are subjected to transformation through the transformation matrix obtained at the time point.

(3.4) A transformation matrix from a reference pose of any of the movable code points when the moving structure is stationary to a real-time pose of the corresponding movable code point at the time point after the transformation in step (3.3) is calculated by the SVD method.

(3.5) Steps (3.1)-(3.2) are repeated to complete calculation of transformation matrixes of the movable code points at all time points.

Figure 3:
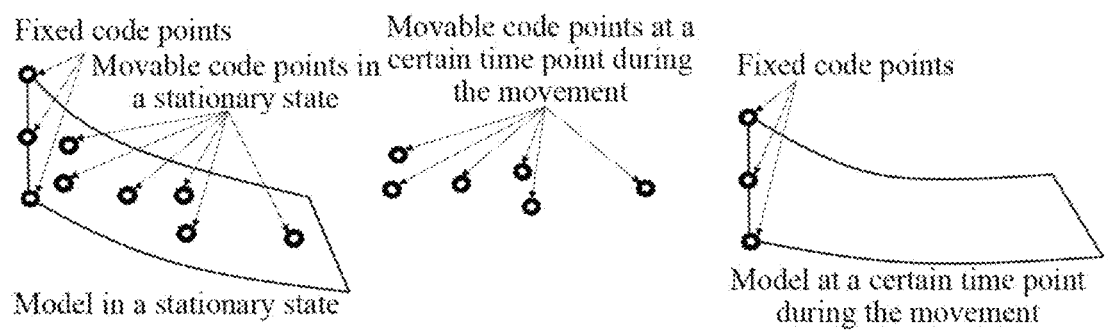
FIG. 3 schematically shows obtaining of a deformed point cloud based on reference state of the fixed code point and the movable code point in a stationary state and the real-time state of the movable code point during deformation according to an embodiment of the disclosure.

(4) A transformation matrix from the reference pose of any of the movable code points when the moving structure is in a static state to a real-time pose of the corresponding movable code point at each time point is calculated, and the point cloud of the moving structure in the 3D point cloud reference model is transformed through the transformation matrix at each time point to obtain real-time point cloud model data. FIG. 3 schematically illustrates the fixed code points, the movable code points and the point cloud of the moving structure when the moving structure is stationary (at the left); the movable code points at a certain time point when the moving structure is in motion (at the middle); and the obtained real-time point cloud of the moving structure (at the right).

Specifically, the step (4) is performed as follows.

(4.1) The point cloud of the moving structure separated in step (2.3) is transformed according to the transformation matrix calculated in step (3.4) to obtain a real-time point cloud model of the moving structure.

(4.2) The real-time point cloud model of the moving structure is combined with a reference point cloud model of the static structure to obtain a complete point cloud model at the current time point.

Figure 4:
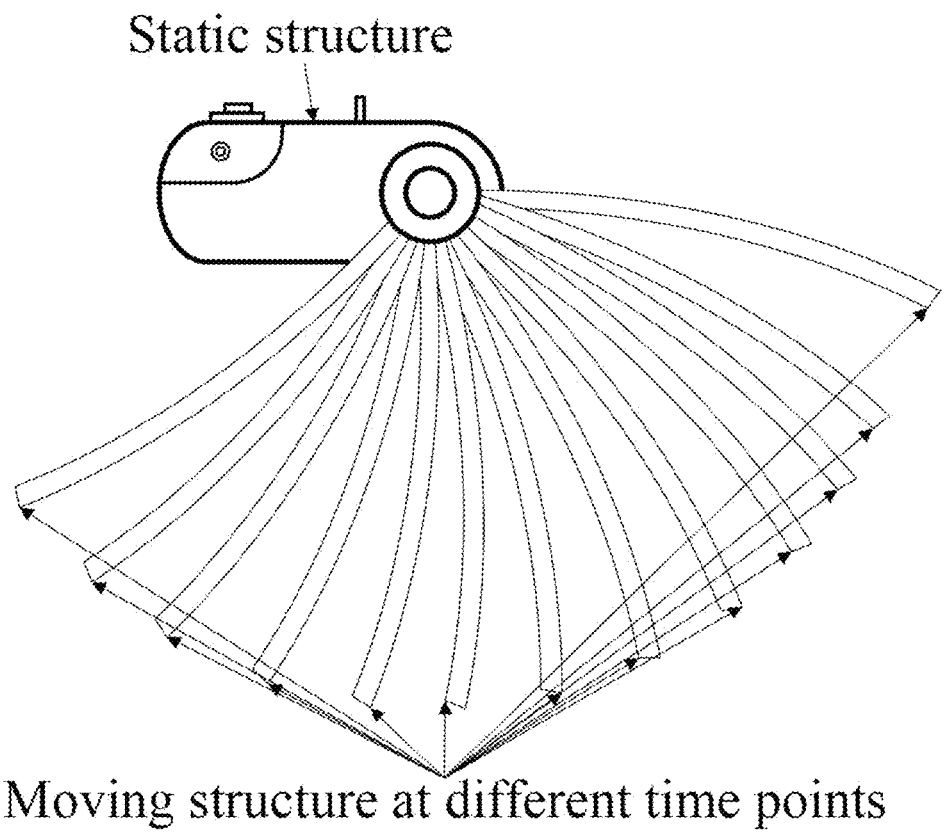
FIG. 4 schematically depicts point cloud models at all time points according to an embodiment of the disclosure.

(4.3) Steps (4.1)-(4.2) are repeated to obtain complete point cloud models at all time points (as shown in FIG. 4).

Described above are merely some embodiments of the disclosure, which are not intended to limit the disclosure. Any changes, modifications and replacements made by those skilled in the art without departing from the spirit of the disclosure should fall within the scope of the disclosure.

What is claimed is:

1. A code point-driven three-dimensional (3D) point cloud deformation method for monitoring a deformation state of a moving structure relative to a static structure connected thereto, comprising:

(1) pasting a plurality of movable code points for recording a real-time pose of the moving structure on a surface of the moving structure, and pasting a plurality of fixed code points on the static structure;

(2) when the moving structure is in a static state, obtaining a reference pose of each of the plurality of movable code points and a reference pose of each of the plurality of fixed code points using a dual-camera measurement system, and at the same time, obtaining a 3D point cloud reference model comprising parts of the moving structure and parts of the static structure using a 3D laser scanner;

(3) when the moving structure is moving, regularly photographing, by the dual-camera measurement system, the moving structure and the static structure to obtain a real-time pose of each of the plurality of movable code points and a real-time pose of each of the plurality of fixed code points at different time points; aligning each of the plurality of fixed code points at each time point with the corresponding fixed code point when the moving structure is in a static state, and comparing the reference pose of any of the plurality of movable code points when the moving structure is in a static state with a real-time pose of the corresponding movable code point at each time point; and (4) calculating a transformation matrix from the reference pose of any of the plurality of movable code points when the moving structure is in a static state to real-time pose of the corresponding movable code point at each time point; and transforming point cloud of the moving structure in the 3D point cloud reference model through the transformation matrix at each time point to obtain real-time point cloud model data.

2. The code point-driven 3D point cloud deformation method of claim 1, wherein the dual-camera measurement system comprises cameras C1 and C2, and step (2) comprises:

(2.1) when the moving structure is in a static state, taking an image containing the moving structure and the static structure respectively by the cameras C1 and C2 at the same time, wherein in step (1), the plurality of movable code points are pasted on a surface of the moving structure facing the dual-camera measurement system, and the plurality of fixed code points are pasted on a surface of the static structure facing the dual-camera measurement system;

solving position data of each of the plurality of movable code points and each of the plurality of fixed code points according to spatial position information of the same point in the two images taken by the cameras C1 and C2 using internal and external parameters of the cameras C1 and C2 to obtain three-dimensional coordinates of each of the plurality of movable code points and each of the plurality of fixed code points in a coordinate system of the cameras C1 and C2 as a reference state for feedback of a subsequent motion measurement;

(2.2) subjecting the moving structure and the static structure to 3D scanning using the 3D laser scanner to obtain the 3D point cloud reference model comprising the parts of the moving structure and the static structure; and (2.3) dividing the 3D point cloud reference model into the point cloud of the moving structure and a point cloud of the static structure.

3. The code point-driven 3D point cloud deformation method of claim 2, wherein in step (2.1), a three-dimensional coordinate of each code point is solved through steps of:

supposing that a code point $P(X,Y,Z)$ has a corresponding point $P_1$ $(u_1,v_1)$ in the image taken by the camera C1 and a corresponding point $P_2$ $(u_2,v_2)$ in the image taken by the camera C2, wherein projection matrixes of the cameras C1 and C2 are respectively M and N:

$$M = \begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix}$$

$$N = \begin{bmatrix} n_{11} & n_{12} & n_{13} & n_{14} \\ n_{21} & n_{22} & n_{23} & n_{24} \\ n_{31} & n_{32} & n_{33} & n_{34} \end{bmatrix};$$

wherein $m_{ij}$ is an element in the $i^{th}$ row and the $j^{th}$ column of the projection matrix M; and $n_{ij}$ is an element in the $i^{th}$ row and the $j^{th}$ column of the projection matrix N;

deducing equations (1) and (2) based on the projection matrixes M and N:

$$Z_1 \begin{bmatrix} u_1 \\ v_1 \\ 1 \end{bmatrix} = \begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix} \begin{bmatrix} X \\ Y \\ Z \\ 1 \end{bmatrix} \qquad (1)$$

$$Z_2 \begin{bmatrix} u_2 \\ v_2 \\ 1 \end{bmatrix} = \begin{bmatrix} n_{11} & n_{12} & n_{13} & n_{14} \\ n_{21} & n_{22} & n_{23} & n_{24} \\ n_{31} & n_{32} & n_{33} & n_{34} \end{bmatrix} \begin{bmatrix} X \\ Y \\ Z \\ 1 \end{bmatrix}; \qquad (2)$$

wherein $Z_1$ is a Z-axis coordinate of the code point P in a coordinate system of the camera C1; $Z_2$ is a Z-axis coordinate of the code point P in a coordinate system of the camera C2; $(u_1, v_1, 1)$ is a homogeneous coordinate of the point $P_1$ in the image taken by the camera C1; $(u_2, v_2, 1)$ is a homogeneous coordinate of the point $P_2$ in the image taken by the camera C2; and (X,Y,Z,1) is a homogeneous coordinate of the code point P in a world coordinate system;

eliminating $Z_1$ and $Z_2$ through the equations (1) and (2) to obtain four linear equations of X, Y and Z:

$$(u_1 m_{31} - m_{11})X + (u_1 m_{32} - m_{12})Y + (u_1 m_{33} - m_{13})Z = m_{14} - u_1 m_{34}$$

$$(v_1 m_{31} - m_{21})X + (v_1 m_{32} - m_{22})Y + (v_1 m_{33} - m_{23})Z = m_{24} - v_1 m_{34}$$

$$(u_2 n_{31} - n_{11})X + (u_2 n_{32} - n_{12})Y + (u_2 n_{33} - n_{13})Z = n_{14} - u_2 n_{34}$$

$$(v_2 n_{31} - n_{21})X + (v_2 n_{32} - n_{22})Y + (v_2 n_{33} - n_{23})Z = n_{24} - v_2 n_{34};$$

and solving the four linear equations to obtain the coordinate (X,Y,Z) of the code point P.

4. The code point-driven 3D point cloud deformation method of claim 2, wherein step (3) comprises:
   (3.1) when the moving structure is in motion, at any time point, taking an image containing the moving structure and the static structure respectively by the cameras C1 and C2 at the same time;
   solving position data of each of the plurality of movable code points and each of the plurality of fixed code points at the time point according to spatial position information of the same point in the two images taken by the cameras C1 and C2 using internal and external parameters of the cameras C1 and C2 to obtain three-dimensional coordinates of each of the plurality of movable code points and each of the plurality of fixed code points in the coordinate system of the cameras C1 and C2 at the time point;
   (3.2) calculating a transformation matrix from a real-time pose of any of the plurality of fixed code points to a reference pose of the corresponding fixed code point when the moving structure is stationary by singular value decomposition (SVD) method;
   (3.3) transforming poses of all of the plurality of movable code points and the plurality of fixed code points at the time point through the transformation matrix obtained at the time point;
   (3.4) calculating a transformation matrix from a reference pose of any of the plurality of movable code points when the moving structure is stationary to a real-time pose of the corresponding movable code point at the time point after the transformation in step (3.3) by the SVD method; and
   (3.5) repeating steps (3.1)-(3.4) to complete calculation of transformation matrixes of the plurality of movable code points at all time points.

5. The code point-driven 3D point cloud deformation method of claim 3, wherein step (3) comprises:
   (3.1) when the moving structure is in motion, at any time point, taking an image containing the moving structure and the static structure respectively by the cameras C1 and C2 at the same time;
   solving position data of each of the plurality of movable code points and each of the plurality of fixed code points at the time point according to spatial position information of the same point in the two images taken by the cameras C1 and C2 using internal and external parameters of the cameras C1 and C2 to obtain three-dimensional coordinates of each of the plurality of movable code points and each of the plurality of fixed code points in the coordinate system of the cameras C1 and C2 at the time point;
   (3.2) calculating a transformation matrix from a real-time pose of any of the plurality of fixed code points to a reference pose of the corresponding fixed code point when the moving structure is stationary by singular value decomposition (SVD) method;
   (3.3) transforming poses of all of the plurality of movable code points and the plurality of fixed code points at the time point through the transformation matrix obtained at the time point;
   (3.4) calculating a transformation matrix from a reference pose of any of the plurality of movable code points when the moving structure is stationary to a real-time pose of the corresponding movable code point at the time point after the transformation in step (3.3) by the SVD method; and
   (3.5) repeating steps (3.1)-(3.4) to complete calculation of transformation matrixes of the plurality of movable code points at all time points.

6. The code point-driven 3D point cloud deformation method of claim 4, wherein step (4) comprises:
   (4.1) transforming the point cloud of the moving structure separated in step (2.3) according to the transformation matrix calculated in step (3.4) to obtain a real-time point cloud model of the moving structure;
   (4.2) combining the real-time point cloud model of the moving structure with a reference point cloud model of the static structure to obtain a complete point cloud model at the current time point; and
   (4.3) repeating steps (4.1)-(4.2) to obtain complete point cloud models at all time points.

7. The code point-driven 3D point cloud deformation method of claim 5, wherein step (4) comprises:
   (4.1) transforming the point cloud of the moving structure separated in step (2.3) according to the transformation matrix calculated in step (3.4) to obtain a real-time point cloud model of the moving structure;
   (4.2) combining the real-time point cloud model of the moving structure with a reference point cloud model of the static structure to obtain a complete point cloud model at the current time point; and
   (4.3) repeating steps (4.1)-(4.2) to obtain complete point cloud models at all time points.

* * * * *